United States Patent
Sarbell

Patent Number: 5,832,162
Date of Patent: Nov. 3, 1998

[54] MULTIPLE FIBER FUSION SPLICE PROTECTION SLEEVE

[75] Inventor: John P. Sarbell, Grand Island, Fla.

[73] Assignee: TII Industries, Inc., Copiague, N.Y.

[21] Appl. No.: 796,926

[22] Filed: Feb. 7, 1997

Related U.S. Application Data

[63] Continuation-in-part of Ser. No. 573,260, Dec. 15, 1995, abandoned.

[51] Int. Cl.$^6$ .................................................. G02B 6/255
[52] U.S. Cl. .............................................................. 385/99
[58] Field of Search ................................. 385/95–99, 114

[56] References Cited

U.S. PATENT DOCUMENTS

| | | | |
|---|---|---|---|
| 4,254,865 | 3/1981 | Pacey et al. | 385/99 |
| 4,319,802 | 3/1982 | Bowes | 385/86 |
| 4,489,830 | 12/1984 | Charlebois et al. | 385/135 |
| 4,509,820 | 4/1985 | Murata et al. | 385/98 |
| 4,778,242 | 10/1988 | Ota et al. | 385/96 |
| 4,846,545 | 7/1989 | Estabrook et al. | 385/99 |
| 4,863,234 | 9/1989 | Gladenbeck et al. | 385/99 |
| 5,074,635 | 12/1991 | Justice et al. | 385/95 |
| 5,355,429 | 10/1994 | Lee et al. | 385/136 |
| 5,367,591 | 11/1994 | Seike et al. | 385/51 |
| 5,375,185 | 12/1994 | Hermsen et al. | 385/135 |
| 5,428,705 | 6/1995 | Hermsen et al. | 385/135 |
| 5,471,555 | 11/1995 | Braga et al. | 385/136 |

FOREIGN PATENT DOCUMENTS

| | | |
|---|---|---|
| 58-93020 | 6/1983 | Japan . |
| 62-21107 | 1/1987 | Japan . |

*Primary Examiner*—Hemang Sangmavi
*Attorney, Agent, or Firm*—Morgan & Finnegan, L.L.P.

[57] ABSTRACT

A splice protection sleeve including rigid strength members and a melt-flow plastic adhesive inner tube member contained within a heat shrinkable outer tube member. The strength members are positioned on either side of the inner tube. In use, multiple optical fibers are inserted into the inner tube and fusion spliced. Upon the application of heat to the fusion splice protection sleeve, the heat shrinkable outer tube contracts around the strength members and inner tube and the inner tube melts filing vacant areas within the outer tube. Upon cooling, the melt-flow adhesive binds the strength members, multiple optical fibers and outer tube of the fusion splice protection sleeve. Because the melt-flow adhesive inner tube containing the optical fibers is sandwiched between the strength members, upon heating and cooling of the fusion splice protection sleeve, the outer tube substantially maintains its original cross-sectional geometry, applying evenly distributed forces to the multiple optical fibers.

16 Claims, 6 Drawing Sheets

MULTIPLE FIBER FUSION SPLICE PROTECTION SLEEVE

This patent is a continuation-in-part of U.S. Pat. application Ser. No. 08/573,260, which was filed on Dec. 15, 1995 now abandoned.

TECHNICAL FIELD

This invention relates to splice protection sleeves for optical fibers and, more specifically, fusion splice protection sleeves for multiple optical fibers.

BACKGROUND OF THE INVENTION

Optical fiber communications systems are extensively used in the telecommunications industry due to their large information carrying capacity, their virtually noise-free performance and the long span distances achievable before regeneration and amplification of the signal is required. In any communication system employing optical fibers, distributions stations where optical fiber cross connections, interconnections and terminations can be performed are required. Often these distributions stations are located remote from central offices, for example, at customer premises or areas serviced by local area networks.

At each distribution station, optical fibers must be separated from outer protective cable components for splicing and termination. For example, fiber optic ribbon is formed of individual optical fibers adhered in a flat matrix by a suitable encapsulated resin. Access to the individual optical fibers in a fiber optic ribbon requires separation of the optical fibers from the fiber optic ribbon. Removal of optical fibers from their outer protective cabling components makes the optical fibers vulnerable to damage. To insure that the optical fibers do not split, bend or break, protection, control and strain relief are required.

Several different types of enclosures are currently available to protect optical fibers and fiber optic cables. These include, for example, the enclosures described in the U.S. Pat. No. 4,502,754 to Kawa dated Mar. 5, 1985, U.S. Pat. No. 5,119,459 to Meyerhoefer et al. dated Jun. 2, 1992, U.S. Pat. No. 4,717,231 to Dewez et al. dated Jan. 5, 1988, U.S. Pat. No. 5,274,731 to White dated Dec. 28, 1993, U.S. Pat. No. 5,278,933 to Hensinger et al. dated Jan. 11, 1994, TII-DITEL 288 0SC optical splice closure, Siecor FDC products and AT&T LSC products.

Optical fibers in such enclosures are spliced and secured once spliced, for example, as shown in U.S. Pat. No. 4,627,686 to Szentesi dated Dec. 9, 1986, U.S. Pat. No. 4,171,867 to Cocito dated Oct. 23, 1979, U.S. Pat. No. 4,266,853 to Hutchins et al. dated May 12, 1981 and U.S. Pat. No. 4,489,830 to Charlebois et al. dated Dec. 25, 1984. Fusion splicing of optical fibers entails remelting of the optical fiber material of ends of the optical fibers to be spliced and joining the ends together while molten in a precise controlled manner. Fusion splicing provides for minimal attenuation (power loss) and back reflection during use of the fused optical fiber, normally less than that of mechanical spliced optical fibers. Optical fiber strain relief devices and systems may be provided to protect spliced fibers, as shown, for example in U.S. Pat. No. 5,375,185 to Hermsen et al. dated Dec. 20, 1994, U.S. Pat. No. 5,471,555 to Braga et al. dated Nov. 28, 1995, U.S. Pat. No. 5,428,705 to Hermsen et al. dated Jun. 27, 1995, U.S. Pat. No. 5,074,635 to Justice et al. dated Dec. 24, 1991, U.S. Pat. No. 5,367,591 to Seike et al. dated Nov. 22, 1994, U.S. Pat. No. 4,863,234 to Gladenbeck et al. dated Sep. 5, 1989, U.S. Pat. No. 4,846,545 to Estabrook et al. dated Jul. 11, 1989, U.S. Pat. No. 4,778,242 to Ota et al. dated Oct. 18, 1988, U.S. Pat. No. 4,319,802 to Bowes dated Mar. 16, 1982, U.S. Pat. No. 4,254,865 to Pacey et al. dated Mar. 10, 1981, U.S. Pat. No. 5,355,429 to Lee et al. dated Oct. 11, 1994, Japanese Patent No. 58-93020 dated Jun. 2, 1983 and Japanese Patent No. 62-21107 dated Jan. 29, 1987.

Fusion splice protection sleeves may also be provided to protect, control and provide strain relief for spliced fibers. Currently available fusion splice protection sleeves for multiple spliced optical fibers have shortcomings. For example, as shown in FIGS. 1–3, in prior art fusion splice protection sleeves 10 for multiple fusion spliced optical fibers 12, a strength member 16 and an inner tube member 14 are enclosed within an outer tube member 18. The outer tube member 18 is made of a heat shrinkable plastic material and the inner tube 14 is made of a melt-flow plastic adhesive material. The inner tube member 14 is positioned to one side of the strength member 16 and the optical fibers 12 are contained within the inner tube 14.

Before heating of the fusion splice protection sleeve 10, the outer tube 18 is round in cross-section and optical fibers 12 can be inserted in opening 20 in the inner tube 14 as shown in FIG. 1. Upon heating of the fusion splice protection sleeve 10, the outer tube 18 contracts around the inner tube 14 and strength member 16 and the inner tube 14 melts filling the vacant area within the outer tube 18 as shown in FIGS. 2 and 3. Upon cooling, the melt-flow adhesive binds the strength member, multiple optical fibers and outer tube. Because the inner tube 14 containing the optical fibers 12 are positioned to one side of the strength member 16, upon heating and cooling of the fusion splice protection sleeve 10, the outer tube 18 is deformed from its original cross-section as shown in FIGS. 2 and 3, applying unevenly distributed forces to the multiple optical fibers 12 within the fusion splice protection sleeve 10. Unevenly distributed forces can create undesirable microbends, fractures and breaks within the optical fibers. Moreover, the nonsymmetrical profile of the resulting fusion splice protection sleeve 10 as shown in FIGS. 2 and 3 adds to the difficulty of storage of the sleeve within an enclosure.

Thus, there is a need in the art for an fusion splice protection sleeve for protecting, controlling and providing strain relief for fusion spliced multiple optical fibers.

SUMMARY OF THE INVENTION

The invention provides for a splice protection sleeve for optical fibers, specifically a fusion splice protection sleeve for multiple optical fibers, and a method of using the same.

The splice protection sleeve includes two rigid strength members and a melt-flow plastic adhesive inner tube member contained within a heat shrinkable outer tube member. The strength members are positioned on either side of the inner tube. In use, multiple optical fibers are inserted into the inner tube and fusion spliced. Upon the application of heat to the splice protection sleeve, the heat shrinkable outer tube contracts around the strength members and inner tube and the inner tube melts filling vacant areas between the multiple optical fibers, strength members and outer tube. Upon cooling, the melt-flow adhesive binds the strength members, multiple optical fibers and outer tube of the splice protection sleeve. Because the melt-flow adhesive inner tube containing the optical fibers is sandwiched between the strength members, upon heating and cooling of the splice protection sleeve, the outer tube substantially maintains its original cross-sectional geometry, applying evenly distributed forces to the multiple optical fibers.

Thus, the splice protection sleeve of the invention provides protection, control and strain relief for fusion spliced multiple optical fibers.

DESCRIPTION OF PREFERRED EMBODIMENT

Referring to FIGS. 4–11, there are shown two embodiments of a splice protection sleeve for multiple fusion spliced optical fibers in accordance with the invention.

Figure 1:
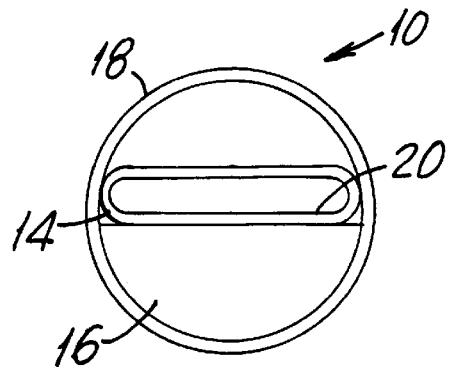
FIG. 1 is a cross-sectional view of a prior art multiple fiber fusion splice protection sleeve.
Figure 2:
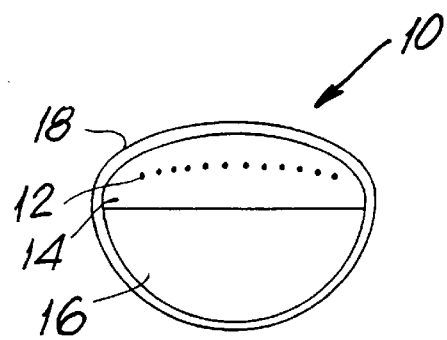
FIG. 2 is a cross-sectional view of a prior art multiple fiber fusion splice protection sleeve.
Figure 3:
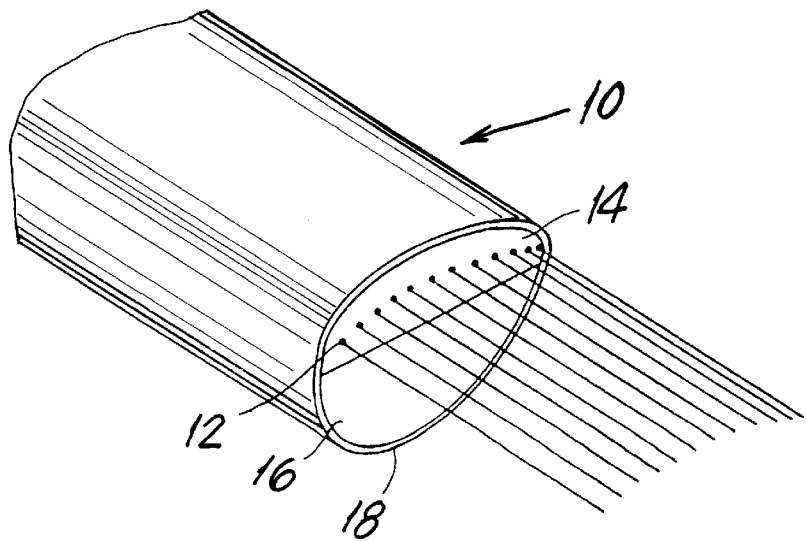
FIG. 3 is a perspective view of a prior art multiple fiber fusion splice protection sleeve.
Figure 4:
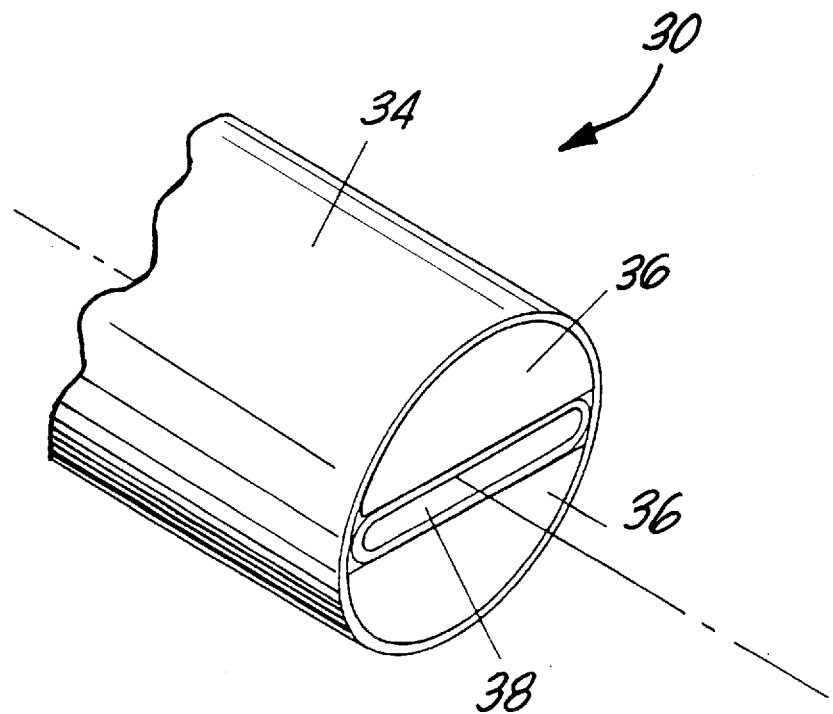
FIG. 4 is a perspective view of an embodiment of a multiple fiber fusion splice protection sleeve in accordance with the invention.
Figure 5:
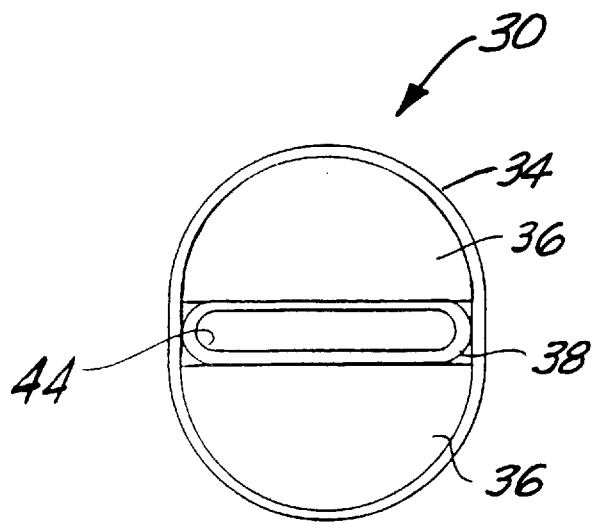
FIG. 5 is a cross-sectional view of an embodiment of a multiple fiber fusion splice protection sleeve in accordance with the invention.
Figure 6:
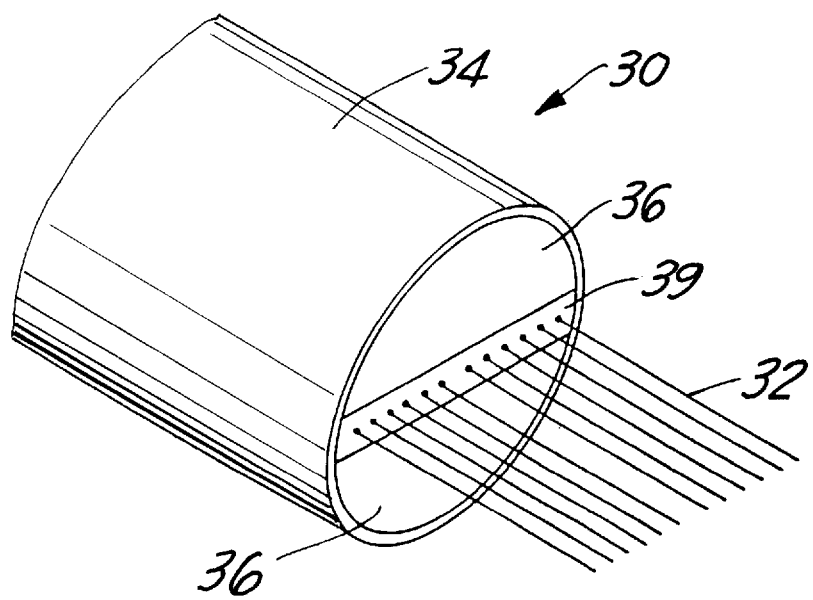
FIG. 6 is a perspective view of an embodiment of a multiple fiber fusion splice protection sleeve in accordance with the invention.
Figure 7:
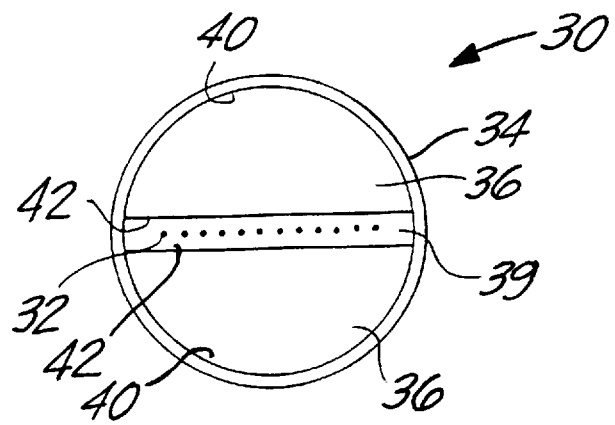
FIG. 7 is a cross-sectional view of an embodiment of a multiple fiber fusion splice protection sleeve in accordance with the invention.
Figure 8:
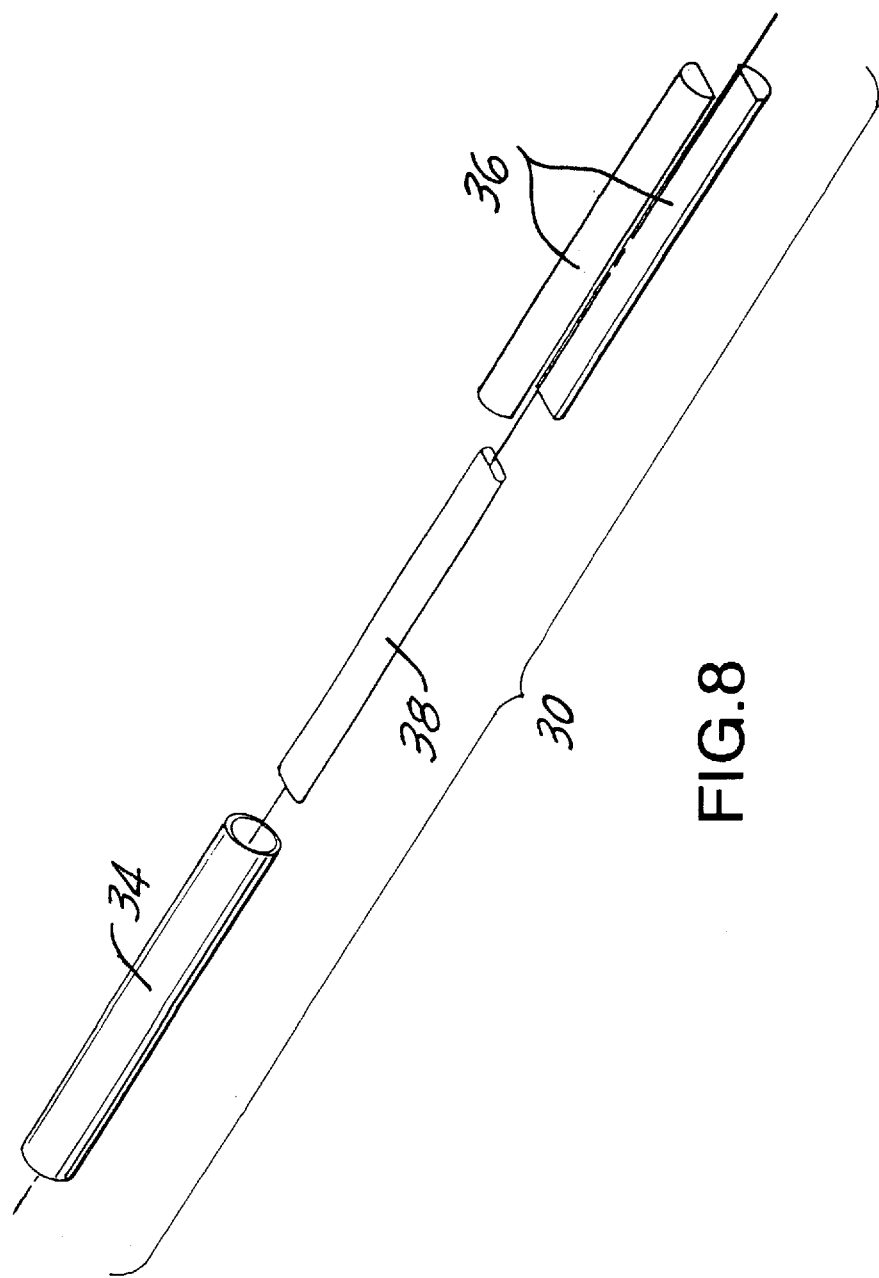
FIG. 8 is an exploded view of an embodiment of a multiple fiber fusion splice protection sleeve in accordance with the invention.
Figure 9:
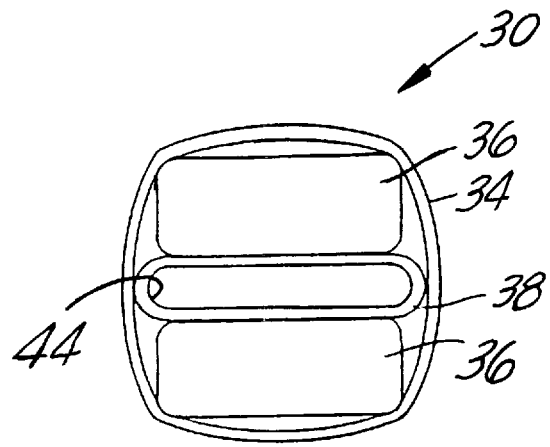
FIG. 9 is a cross-sectional view of an alternative embodiment of a multiple fiber fusion splice protection sleeve in accordance with the invention.
Figure 10:
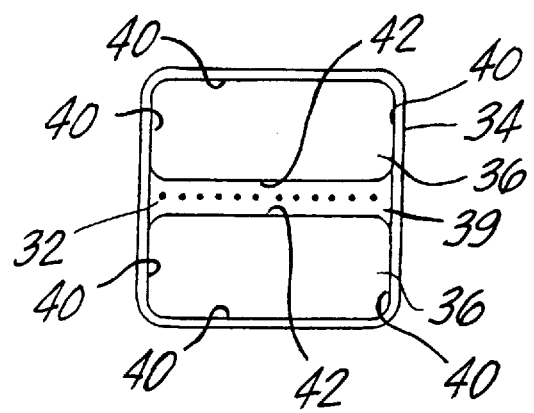
FIG. 10 is a cross-sectional view of an alternative embodiment of a multiple fiber fusion splice protection sleeve in accordance with the invention.
Figure 11:
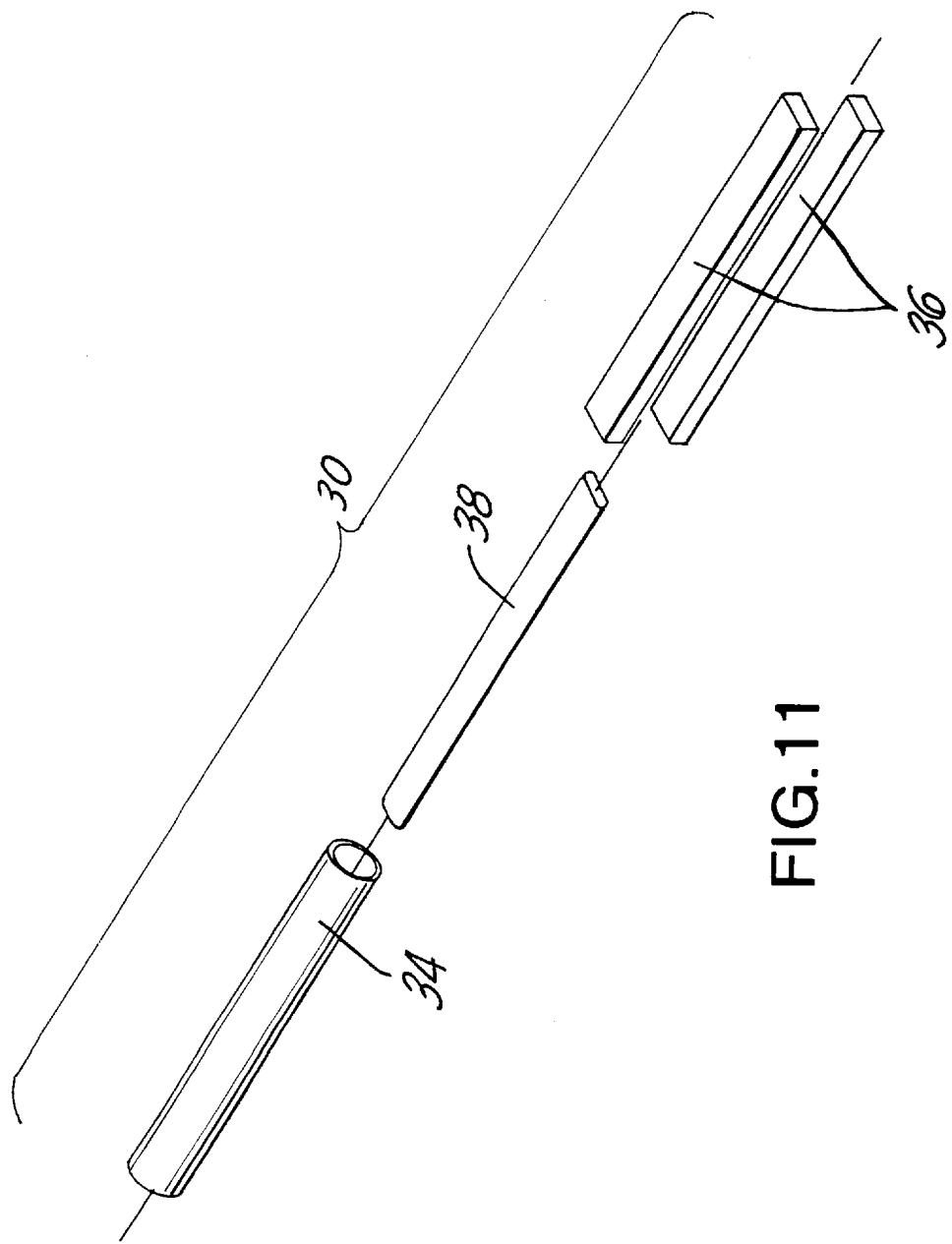
FIG. 11 is an exploded view of an alternative embodiment of a multiple fiber fusion splice protection sleeve in accordance with the invention.

The fusion splice protection sleeve 30 for multiple fusion spliced optical fibers 32 includes an outer tubular member 34, strength members 36 and an inner tubular member 38. The outer tube 34 is preferably made of a polyolefin heat shrinkable material. The strength members 36 are preferably made of either clear quartz or polyetherimide. The inner tube 38 is preferably made of a polyolefin copolymer melt-flow plastic material. The strength members 36 are positioned on either side of the inner tube 38 and the outer tube 34 encompasses the inner tube 38 and strength member 36. The strength members 36 can have a semicircular cross-section as shown in FIGS. 4–8, a substantially rectangular cross-section as shown in FIGS. 9–11 or any other suitable cross-sectional configuration.

Prior to fusion splicing of the multiple optical fibers 32, ends of optical fibers are inserted into opening 44 in the inner tube 38 of the fusion splice protection sleeve 30. The ends of the optical fibers are pulled through the inner tube 38 of the fusion splice protection sleeve 30 so that the fusion splice protection sleeve 30 is a distance away from the ends of the optical fibers to be spliced. The ends of the optical fibers are then joined through the fusion splice process to corresponding ends of optical fibers to create fusion spliced optical fibers 32. After fusion splicing of the multiple optical fibers 32, the fusion splice protection sleeve 30 is slid back over the multiple optical fibers 32 so that the inner tube 38, strength members 36 and outer tube 34 are centered directly over the fusion spliced portion of multiple optical fibers 32.

The fusion splice protection sleeve 30 containing the fusion spliced multiple optical fibers 32 is then inserted into a heater. Heating of the fusion splice protection sleeve 30 causes the inner tube 38 surrounding the multiple optical fibers 32 to melt and the outer tube 34 to shrink in a controlled manner. The melt-flow adhesive material of the inner tube 38 flows to fill interstices between the multiple optical fibers 32, strength members 36 and outer tube 34 and coats the surfaces of the multiple optical fibers 32. The shrinking of the outer tube 34 forces the melt-flow adhesive material of the inner tube 38 against the multiple optical fibers 32 so that the melt-flow adhesive encompasses the fibers 32. The outer tube is designed to shrink evenly so as to create an equal hoop stress on outer surface segments 40 of the strength members 36. Inner surfaces 42 of the strength members 36 exert equal forces on the melt-flow adhesive material of the inner tube 38 which in turn exerts equal forces on the surfaces of the multiple optical fibers 32.

After heating of the fusion splice protection sleeve 30 is complete, the fusion splice protection sleeve 30 is removed from the heater and is allowed to cool. Upon cooling of the fusion splice protection sleeve 30, the melt-flow adhesive material of the inner tube 38 solidifies around the multiple optical fibers 32 as shown at 39 in FIGS. 6, 7 and 10 forming an inner protective envelope between the strength members and thereby providing protection for multiple fusion spliced optional fibers 32.

To provide strain relief, support and protection, multiple fiber fusion splice protection sleeve, including the strength members, inner tubular member and outer tubular member, in accordance with the invention must provide adequate support to optical fibers and prevent bending or tension of the optical fiber ribbons. Constructing the multiple fiber fusion splice protection sleeve of suitable materials would be apparent to persons skilled in the art. Exemplary materials for the components of the preferred embodiments of the multiple fiber fusion splice protection sleeve in accordance with the invention are set forth herein. Other materials for the multiple fiber fusion splice protection sleeve adequate to provide strain relief, support and protection would be apparent to persons skilled in the art.

The multiple fiber fusion splice protection sleeve in accordance with the invention is made of suitable dimensions to fulfill its intended purpose. Exemplary dimensions of the preferred embodiments of the multiple fiber fusion splice protection sleeve in accordance with the invention are set forth in the example below. Other dimensions for the multiple fiber fusion splice protection sleeve adequate to provide strain relief, support and protection would also be apparent to persons skilled in the art.

EXAMPLE

The materials from which a preferred embodiment of a fusion splice protective sleeve for multiple optical fibers in accordance with the invention was made and the properties of those materials are set forth in the table below:

| OUTER TUBE | | STRENGTH MEMBERS | |
|---|---|---|---|
| Material: | Polyolefin | Material: | Clear quartz and/or polyetherimide |
| Working Temperature: | −55° C. to 160° C. (−65° F. to 320° F.) | | |
| Ultimate Strength: | 220 Kg/cm$^2$ | COMPLETED SHRINK | |
| Elongation: | 650% | Clarity: | Fiber/splice visible |
| Specific Gravity: | 0.95 | Ends: | Smooth/even/consistent |
| Water Absorption: | 0.05% | Shrink Time: | 120 seconds |
| Minimum Shrink Temperature: | 100° C. (212° F.) | Toxicity: | None |
| Fungus Resistance: | Inert | DIMENSIONS | |
| Solvent Resistance: | Good | (Completed Shrink) | |
| Acid Resistance: | Excellent | Diameter: | .200 in.–.220 in. |
| INNER TUBE | | | (Oval cross-section) |
| Material: | Polyolefin copolymer | Length: | 40 mm, 50 mm or 60 mm |
| Ultimate Strength: | 200 Kg/cm$^2$ | | (40 mm most common) |
| Elongation: | 700% | | |
| Melting Point: | 80° C. (176° F.) | | |
| Specific Gravity: | 0.93 | | |

It will appreciated by persons skilled in the art that herein described is an multiple fiber fusion splice protection sleeve and method of use. While the present invention has been described by reference to various preferred embodiments, it will be understood by persons skilled in the art that many modfications and variations may be made in those preferred embodiments without departing from the spirit and scope of the present invention. Accordingly, it is intended that the invention not be limited to the disclosed preferred embodiments and that it have the full scope permitted by the following claims.

I claim:

1. A splice protection sleeve for protecting spliced optical fiber ribbons, comprising:
   an outer tube made of heat shrinkable material that facilitates a controlled contraction upon the application of heat;
   strength members contained within the outer tube; an inner tube made of a melt-flow adhesive materials;
   the strength members having uniformly shaped exterior surfaces for abutting the outer tube and flat inner surfaces for abutting the inner tube;
   the inner tube positioned between the flat inner surfaces of the strength members for receiving spliced optical fiber ribbons.

2. The spliced protection sleeve of claim 1 wherein the outer tube is made of polyolefin, the inner tube is made of a polyolefin copolymer and at least one of the strength members is made of polyetherimide.

3. The splice protection sleeve of claim 1 wherein the outer tube is round in cross-section.

4. The splice protection sleeve of claim 1 wherein the uniformly shaped exterior surfaces of the strength members are semicircular in cross-section.

5. The splice protection sleeve of claim 1 wherein the uniformly shaped exterior surfaces of the strength members are substantially rectangular in cross-section.

6. The splice protection sleeve of claim 1 wherein application of heat to the outer tube and inner tube causes the outer tube to contract in a controlled manner exerting evenly distributed forces on the uniformly shaped exterior surfaces of the strength members, the flat inner surfaces of the strenath members to exert evenly distributed forces on the inner tube and the inner tube to melt and flow into the interstices between the outer tube, inner tube, strength members and spliced optical fiber ribbons.

7. A splice protection sleeve for protecting spliced optical fiber ribbons, comprising:
   an outer tube made of heat shrinkable material shrunken by the application of heat; strength members contained within the outer tube;
   the strength members having uniformly shaped exterior surfaces abutting the outer tube and flat inner surfaces abutting a solidified melt-flow adhesive material;
   the solidified melt-flow adhesive material contained in the interstices between the outer tube, inner tube, strength members and spliced optical fiber ribbons securing and protecting the spliced optical fiber ribbons.

8. The spliced protection sleeve of claim 7 wherein the outer tube is made of polyolefin, the inner tube is made of a polyolefin copolymer and at least one of the strength members is made of polyetherimide.

9. The splice protection sleeve of claim 8 wherein the outer tube is round in cross-section.

10. The splice protection sleeve of claim 7 wherein the uniformly shaped exterior surfaces of the strength members are semicircular in cross-section.

11. The splice protection sleeve of claim 7 wherein the uniformly shaped exterior surfaces of the strength members are substantially rectangular in cross-section.

12. The splice protection sleeve of claim 7 wherein evenly distributed forces are exerted on surfaces of the optical fiber ribbons through the interaction of the outer tube, strength members and melt-flow adhesive material.

13. The splice protection sleeve of claim 7 having a predetermined cross sectional dimensions to facilitate organization and storage of the sleeve.

14. The splice protection sleeve of claim 7 wherein evenly distributed forces are exerted on the solidified melt-flow adhesive material by the inner surfaces of the strength members through the interaction of the outer tube and strength members.

15. A method of protecting spliced optical fiber ribbons, comprising:
   insertion of optical fiber ribbons into a splice protection sleeve having an outer tube made of a heat shrinkable material, strength members having uniformly shaped exterior surfaces and flat inner surfaces contained within the outer tube, and an inner tube made of a melt-flow adhesive material positioned between the flat inner surfaces of the strength members;
   splicing of the optical fiber ribbons using a fusion splice process;

heating of the splice protection sleeve causing the outer tube to shrink in a controlled manner exerting evenly distributed forces on the uniformly shaped exterior surfaces of the strength members, the flat inner surfaces of the strength members to exert evenly distributed forces on the inner tube and the inner tube to melt and flow into the interstices between the outer tube, inner tube, strength members and spliced optical fiber ribbons;

cooling of the splice protection sleeve causing the melt-flow adhesive material to solidify.

16. The method of claim 15 further comprising storage of the splice protection sleeve in a protective enclosure.

* * * * *